(12) United States Patent
Ökvist et al.

(10) Patent No.: US 11,510,117 B2
(45) Date of Patent: Nov. 22, 2022

(54) METHOD FOR HANDLING OF CONNECTIONS OF WIRELESS DEVICES TO BASE STATIONS BASED ON ALTITUDE INDICATIONS

(71) Applicant: Telefonaktiebolaget LM Ericsson (publ), Stockholm (SE)

(72) Inventors: Peter Ökvist, Luleå (SE); Stefan Wänstedt, Luleå (SE); Tommy Arngren, Södra Sunderbyn (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 130 days.

(21) Appl. No.: 17/041,642

(22) PCT Filed: Mar. 27, 2018

(86) PCT No.: PCT/SE2018/050329
§ 371 (c)(1),
(2) Date: Sep. 25, 2020

(87) PCT Pub. No.: WO2019/190366
PCT Pub. Date: Oct. 3, 2019

(65) Prior Publication Data
US 2021/0120472 A1    Apr. 22, 2021

(51) Int. Cl.
*H04W 4/00* (2018.01)
*H04W 36/00* (2009.01)
(Continued)

(52) U.S. Cl.
CPC . *H04W 36/00835* (2018.08); *H04W 36/0077* (2013.01); *H04W 36/10* (2013.01); *H04W 36/32* (2013.01)

(58) Field of Classification Search
CPC ..... H04W 4/023; H04W 64/00; H04W 4/029; H04W 4/33; H04W 64/003
(Continued)

(56) References Cited

U.S. PATENT DOCUMENTS 9,332,476 B2 * 5/2016 Shatsky ................ G01C 21/12
9,788,194 B1   10/2017 Talley et al.
(Continued)

FOREIGN PATENT DOCUMENTS

EP    3 139 561 A1     3/2017
JP    2015-204593 A   11/2015
(Continued)

OTHER PUBLICATIONS

LG Electronics Inc., "Enhanced MSE using tier for aerial UE", 3GPP TSG-RAN WG2#101, R2-1802538, Athens, Greece, Feb. 26-Mar. 2, 2018 (3 pages).
(Continued)

*Primary Examiner* — David Q Nguyen
(74) *Attorney, Agent, or Firm* — Rothwell, Figg, Ernst & Manbeck, P.C.

(57) ABSTRACT

Disclosed is a method performed by a first base station (10) of a wireless communications network. The first base station (10) provides radio coverage to a first cell (20). The wireless communications network further comprises a second base station providing radio coverage to a second cell (40). A wireless device (50, 60), is located within the first cell (20) and is connected to the first base station (10). The method comprises receiving (202) a message from the WD (50, 60) indicating the second cell, obtaining (204) an indication of an altitude of the access point of the second base station (30), obtaining (206) an indication of an altitude of the WD (50, 60), and obtaining (208) an indication of an altitude of the access point of the first base station (10). The method further
(Continued)

comprises handling (210) a connection of the WD (50, 60) to the first base station (10) based on the altitude indications.

22 Claims, 11 Drawing Sheets

(51) Int. Cl.
*H04W 36/10* (2009.01)
*H04W 36/32* (2009.01)

(58) Field of Classification Search
USPC ...... 370/328, 329, 330, 331; 455/456.3, 445
See application file for complete search history.

(56) References Cited

U.S. PATENT DOCUMENTS

| | | | |
|---|---|---|---|
| 2007/0281705 A1* | 12/2007 | Bosenbecker | H04B 7/18506 455/445 |
| 2011/0247068 A1* | 10/2011 | Tolliver | H04L 63/0236 726/22 |
| 2012/0015684 A1 | 1/2012 | Noji | |
| 2014/0302876 A1* | 10/2014 | Oizumi | G04R 20/14 455/456.3 |
| 2016/0157165 A1 | 6/2016 | Xie et al. | |
| 2017/0245115 A1* | 8/2017 | Lei | H04W 64/006 |
| 2018/0019516 A1 | 1/2018 | Teague | |
| 2021/0144611 A1* | 5/2021 | Wigard | H04W 36/32 |

FOREIGN PATENT DOCUMENTS

| | | | |
|---|---|---|---|
| JP | 2015204593 A * | 11/2015 | |
| WO | WO-2018167351 A1 * | 9/2018 | ........ H04W 36/0058 |
| WO | 2019/117770 A1 | 6/2019 | |
| WO | 2019/160460 A1 | 8/2019 | |

OTHER PUBLICATIONS

Ericsson (Rapporteur), "Summary on [99b#61][LTE/UAV] Identify potential solutions on mobility enhancement", 3GPP TSG-RAN WG2 #100, R2-1713451, Reno, Nevada, USA Nov. 27-Dec. 1, 2017 (23 pages).

International Search Report and Written Opinion issued in International Application No. PCT/SE2Q18/050329 dated Dec. 14, 2018 (11 pages).

3GPP TS 36.300 V14.1.0 (Dec. 2016), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016 (317 pages).

* cited by examiner

| Cell relation entries | | | WD altitude: ground | | | WD altitude: intermediate | | | WD altitude: high | | |
|---|---|---|---|---|---|---|---|---|---|---|---|
| NR | BS1 altitude | BS2 altitude | No remove | No HO | No X2 | No remove | No HO | No X2 | No remove | No HO | No X2 |
| 1 | Ground | Ground | | | x | x | x | x | | x | x |
| 1 | Ground | Intermediate | x | | | | | | | x | |
| 1 | Ground | High | x | | | | | | | | |
| 1 | Intermediate | Ground | | | | x | x | | | x | |
| 1 | Intermediate | Intermediate | x | | x | | | x | | | x |
| 1 | Intermediate | High | x | x | | | | | x | x | |
| 1 | High | Ground | | | x | | x | x | | | x |
| 1 | High | Intermediate | x | | | x | | | x | x | |
| 1 | High | High | x | | | | | | | x | |
| 2 | Ground | Ground | | | x | | x | x | x | | x |
| 2 | Ground | Intermediate | x | x | x | x | | x | | | x |
| 2 | Ground | High | x | | | | | | | x | |
| 2 | Intermediate | Ground | | x | | | x | | x | | |
| 2 | Intermediate | Intermediate | x | x | x | | | x | | x | x |
| 2 | Intermediate | High | x | | x | x | | x | | x | x |
| 2 | High | Ground | | x | | | | | x | x | |
| 2 | High | Intermediate | | x | | | x | | x | x | |
| 2 | High | High | x | | x | x | | x | | | x |
| 3 | Ground | Ground | x | x | | | x | | | | |
| 3 | Ground | Intermediate | | x | x | | x | x | x | x | x |
| 3 | Ground | High | x | | | | | | | | |
| 3 | Intermediate | Ground | x | x | | x | x | | | x | |
| 3 | Intermediate | Intermediate | | x | | | x | | x | | |
| 3 | Intermediate | High | | | x | | x | x | | | x |
| 3 | High | Ground | x | x | x | x | | x | | x | x |
| 3 | High | Intermediate | x | | | | x | | x | | |
| 3 | High | High | | | x | x | | x | | x | x |

Fig. 4

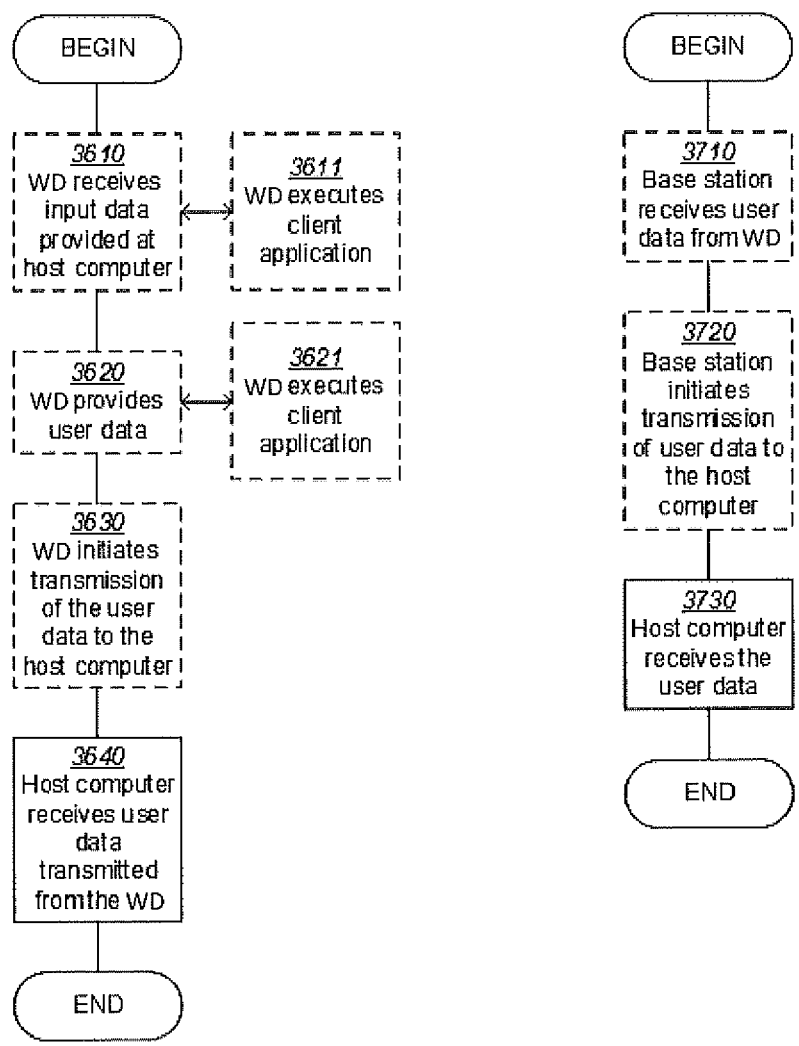

METHOD FOR HANDLING OF CONNECTIONS OF WIRELESS DEVICES TO BASE STATIONS BASED ON ALTITUDE INDICATIONS

CROSS REFERENCE TO RELATED APPLICATION(S)

This application is a 35 U.S.C. § 371 National Stage of International Patent Application No. PCT/SE2018/050329, filed Mar. 27, 2018, designating the United States.

TECHNICAL FIELD

The present disclosure relates generally to methods, base stations and wireless devices of communications networks for handling of connections of wireless devices to base stations, particularly to base stations with the capacity to change altitude.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A wireless communications network comprises network nodes, i.e. base stations or radio base stations, providing radio coverage over at least one respective geographical area forming a cell. The cell definition may also incorporate frequency bands used for transmissions, which means that two different cells may cover the same geographical area but using different frequency bands. Wireless devices, also known as mobile stations, terminals, and/or User Equipment, UEs, are served in the cells by the respective network node and are communicating wirelessly with respective network node. The wireless devices transmit data over an air or radio interface to the network nodes in uplink, UL, transmissions and the network nodes transmit data over an air or radio interface to the wireless devices in downlink, DL, transmissions.

In most wireless communications today, the altitude at which base stations are located, and consequently also their corresponding coverage areas, may differ quite significantly, depending on factors such as their geographical location as well as the layout of the area where they are located. Further, the altitude at which wireless devices are located may differ by virtue of the devices generally being portable.

Considering that base stations may be located at different altitude levels, and also that WDs generally can change their altitude levels, the altitude differences between a WD and base stations which may be suitable for serving the WD, as well as the signal strength detected by the WD from such base stations, may differ. The degree to which signal strength and similar characteristics vary may depend on the environment wherein the base stations and/or WDs are used. For example, a WD at ground level in a city will generally detect other cell relations than a WD which is above the rooftops. Current systems are usually not optimized to handle variations in altitude of base stations and/or of wireless devices.

Consequently, there is a need for better solutions for handling connections and signaling of wireless devices to base stations.

SUMMARY

It is an object of embodiments of the invention to address at least some of the problems and issues outlined above. It is an object of embodiments of the invention to provide a base station and a wireless device which decrease the overall signaling load of a communications network. It is further an object of embodiments of the invention to provide a communications network with a more efficient usage of radio resources, which reduces the overall signaling in the network and improves connections between base stations and wireless devices, and improves handover decisions. It may be possible to achieve these objects and others by using methods, base stations, wireless devices and computer programs as defined in the attached independent claims.

According to one aspect, a method is provided performed by a first base station of a wireless communications network, the first base station comprising an access point providing radio coverage to a first cell. The wireless communications network further comprises a second base station having an access point providing radio coverage to a second cell, and wherein a wireless device, WD, is located within the first cell and is connected to the first base station. The method comprises receiving a message from the WD indicating the second cell, and obtaining an indication of an altitude of the access point of the second base station. The method further comprises obtaining an indication of an altitude of the WD, obtaining an indication of an altitude of the access point of the first base station, and handling a connection of the WD to the first base station based on the altitude indication of the access point of the second base station, the altitude indication of the WD, and the altitude indication of the access point of the first base station.

According to another aspect, a method is provided performed by a wireless device, WD, of a wireless communications network, the wireless communications network comprising a first base station and a second base station. The first base station comprises an access point providing radio coverage to a first cell within which the WD is located and wherein the WD is connected to the first base station. The second base station comprises an access point providing radio coverage to a second cell. The method comprises detecting signals from the second cell, obtaining an indication of an altitude of the access point of the second base station, obtaining an indication of an altitude of the WD, and sending the altitude indication of the access point of the second base station and the altitude indication of the WD to the first base station.

According to another aspect, a first base station operable in a wireless communications network is provided, the first base station comprising an access point operable to provide radio coverage to a first cell. The wireless communications network further comprises a second base station having an access point providing radio coverage to a second cell, wherein a wireless device, WD, is located within the first cell and is operable to be connected to the first base station. The first base station comprises processing circuitry and a memory. The memory contains instructions executable by the processing circuitry, whereby the first base station is operative for receiving a message from the WD indicating the second cell, and obtaining an indication of an altitude of the access point of the second base station. The first base station is further operative for obtaining an indication of an altitude of the WD, obtaining an indication of an altitude of the access point of the first base station, and handling a connection of the WD to the first base station based on the altitude indication of the access point of the second base station, the altitude indication of the WD, and the altitude indication of the access point of the first base station.

According to another aspect, a wireless device is provided, operable in a wireless communications network, the wireless communications network comprising a first base station and a second base station. The first base station comprises an access point providing radio coverage to a first cell within which the WD is located and wherein the WD is operable to be connected to the first base station. The second base station comprises an access point providing radio coverage to a second cell. The WD comprises processing circuitry and a memory—The memory contains instructions executable by the processing circuitry, whereby the WD is operative for detecting signals from the second cell. The WD is further operative for obtaining an indication of an altitude of the access point of the second base station, obtaining an indication of an altitude of the WD, and sending the altitude indication of the access point of the second base station (30) and the altitude indication of the WD to the first base station.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of example embodiments and with reference to the accompanying drawings, in which:

FIG. 4 is a table showing an embodiment of a neighbor relation table.

FIGS. 12 to 15 are flowcharts illustrating methods implemented in a communications network including a host computer, a first base station and a wireless device.

DETAILED DESCRIPTION

Briefly described, a communications network for handling of connections between base stations and wireless devices is provided, which is resource efficient, reduces the overall signaling in the network, and which facilitates handover decisions as compared with existing solutions. The system comprises a first base station, BS, having an access point, AP, providing radio coverage to a first cell, wherein a wireless device, WD, is located within the first cell and is connected to the first base station. The system further comprises a second base station having an AP providing radio coverage to a second cell. The first and/or second base stations may further be connected to a communications network comprising additional nodes, such as an Operations and Management, O&M, node. The WD detects the second cell, and sends a message to the first base station to which it is connected indicating the newly detected second cell. Optionally, the first base station obtains information regarding whether the detected cell is present in a Neighbor Relation Table, NRT, of the first base station before proceeding with the subsequent steps, such that the subsequent steps are only performed if the second cell is not present in a NRT of the first base station. After the first base station has received a message from the WD indicating the second cell, indications of altitude are obtained for an AP of the second base station providing radio coverage to the second cell, for the WD, and for an AP of the first base station providing radio coverage to the WD. When altitude indications of these three entities have been obtained by the first base station, a connection of the WD to the first base station is handled by the first base station based on the obtained information regarding the altitudes of the involved entities. The handling of the connection may e.g. entail making a handover of the WD from the first base station to the second base station, or instructing the WD to stay connected to the first base station.

One insight which is relevant for the present disclosure, is that altitude information is important to consider for both base stations and WDs when considering to which base station a WD should connect. There are previous solutions available that take the altitude of WDs into account, but no solutions which consider both the altitude of the WDs as well as the altitude of the base stations. Thus, by including altitude information in the signaling between base stations and WDs, better and more resource efficient networks may be achieved, with less unnecessary signaling and with better capability to make handover decisions.

Figure 1:
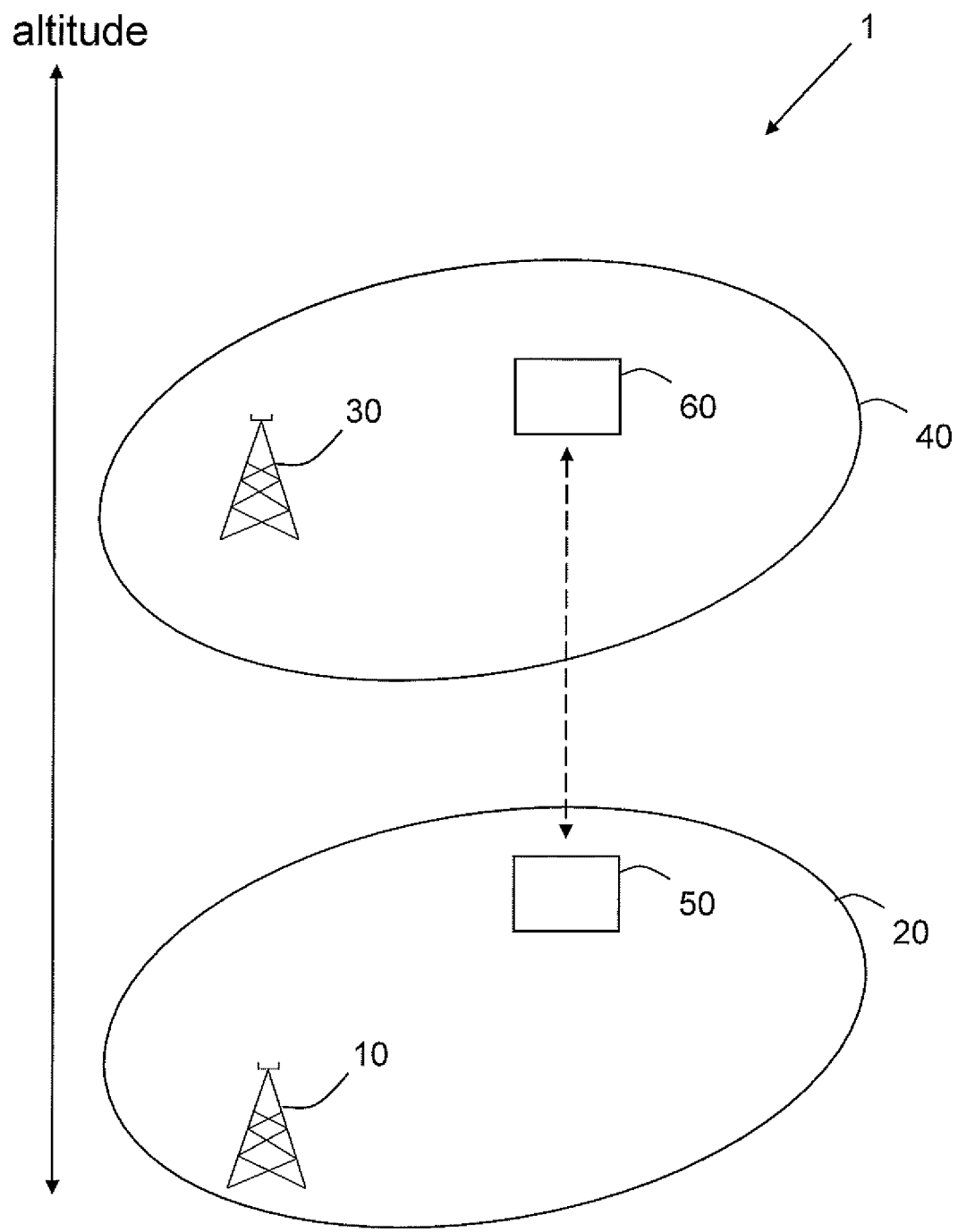
FIG. 1 is a view of a first embodiment of a communications network in which embodiments of the present disclosure may be performed.
Figure 2:
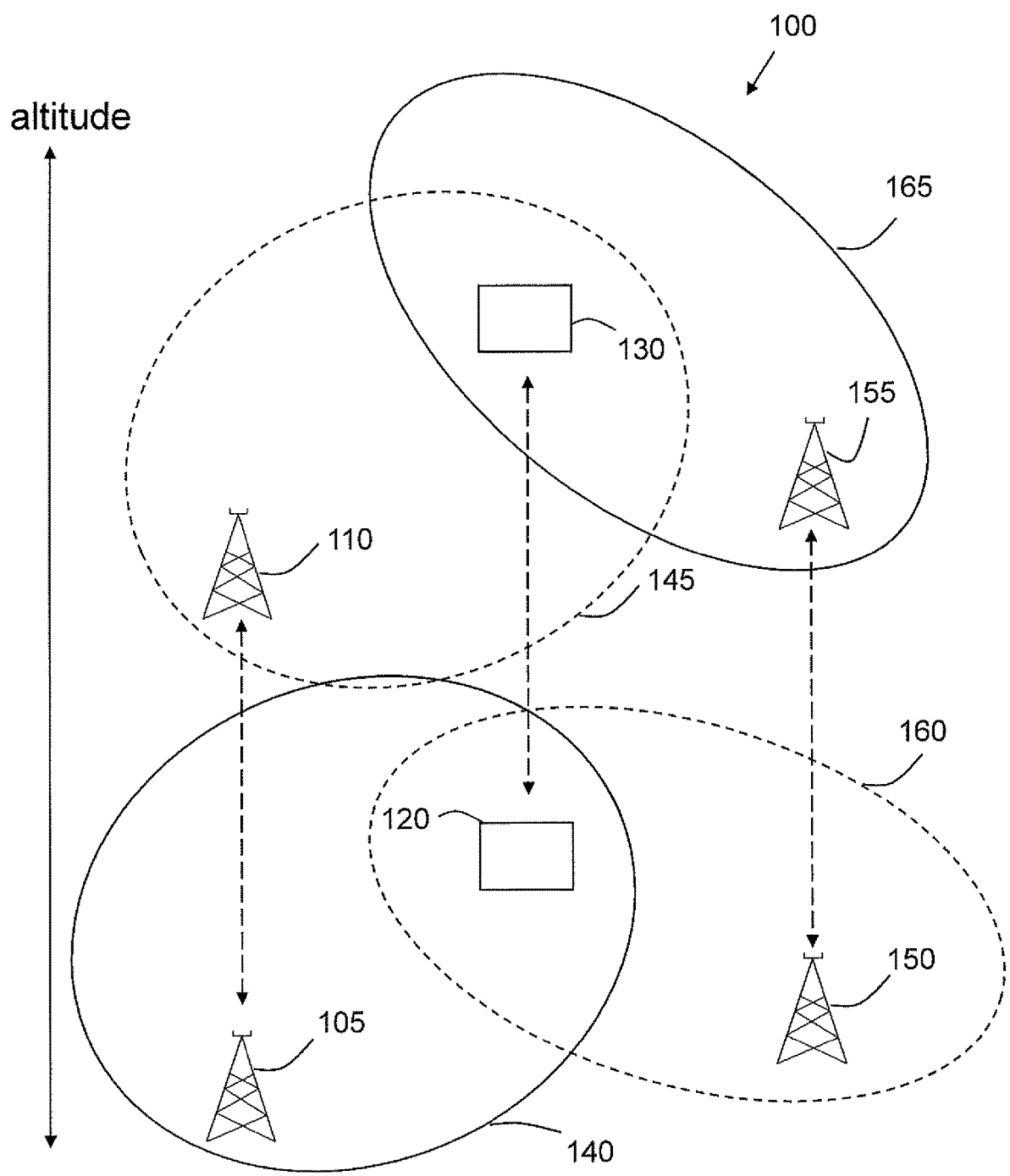
FIG. 2 is a view of a second embodiment of a communications network in which embodiments of the present disclosure may be performed.

FIGS. 1 and 2 show two different examples of a wireless communications network 1, 100 in which embodiments herein may be implemented. The wireless communications network 1, 100 may be a radio communications network, and at least parts of the wireless communications network may communicate via LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system, such as, a future 5G wireless communications network, e.g. New Radio (NR).

Looking now at FIG. 1, the wireless communications network 1 comprises a first base station 10 at a first altitude, having an access point, AP, providing radio coverage to a first cell 20. The communications network further comprises a second base station 30 at a second altitude, having an AP providing radio coverage to a second cell 40, wherein the second altitude is higher than the first altitude. The system 1 further comprises a WD 50, 60, wherein the WD has the capacity to move between a first altitude 50 and a second altitude 60, wherein the second altitude is higher than the first altitude. As can be seen, depending on the altitude of the WD 50, 60, it is better served by either the first base station 10 or by the second base station 30, such that when the WD 50, 60 is at the first attitude 50, it is better served by the first base station 10, and when the WD 50, 60 is at the second altitude 60, it is better served by the second base station 30. However, in order to determine which base station 10, 30 is better suited to serve the WD 50, 60 at which altitude of the WD 50, 60, information regarding the altitudes of at least some of the involved entities needs to be included in communication between the entities.

The APs of the first 10 and second 30 base stations may be transmission points of the base stations 10, 30 such as an antenna providing radio coverage, or it may be the base station 10, 30 as a whole. The term access point is intended to denote a point from which the coverage area of a base station originates, which is typically a point which, if it is varied in altitude, results in a change in the coverage area of the base station, such as the position of one or more antennas of the base station. The AP of a base station is associated with the base station, and in most cases a change in altitude of the base station will result in a change of altitude of its AP.

Looking now at FIG. 2, a similar communications network will be described, but wherein the base stations also have the capacity to change altitude. The wireless communications network 100 comprises a first base station 105, 110 at a first altitude 105 having an AP providing radio coverage to a first cell 140, 145. The first base station 105, 110 may in some embodiments have the capacity to change altitude, or change the altitude of its AP, as illustrated by the second position 110 of the first base station. A change in altitude of the first base station 105, 110 results in a corresponding change in the area, i.e. the first cell 140, 145, to which it provides radio coverage, such that at the first altitude 105 the first base station 105, 110 provides radio coverage to the cell 140 at a first altitude, and at the second altitude 110 of the first base station 105, 110 it provides radio coverage to the cell 145 at a second altitude. The communications network 100 further comprises a second base station 150, 155 at a second altitude 155 having an AP providing radio coverage to a second cell 165 at a second altitude. The second base station 150, 155 may also has the capacity to change its altitude, or the altitude of its AP, to a first altitude 150, wherein it provides radio coverage to the second cell 160 at a first altitude. The first and second base stations may both be of the type eNB, eNodeB, a home Node B, a Home eNode B, a gNode B, or any other network unit capable to serve a WD in the wireless communications network 100. The communications network 100 further comprises a WD 120, 130 at a first altitude 120, with the capacity to change altitude to a second altitude 130, wherein the second altitude is higher than the first altitude.

When determining which base station is more suitable for serving the WD 120, 130, a better analysis may be achieved by also considering altitude information of the entities involved, which has traditionally not been the case. This can be seen in FIG. 2, where the WD 120, 130 at the first altitude 120 is better served by the first base station 105, 110 when it is at the first altitude 105 and thus has the corresponding coverage area 140

This can be seen in FIG. 2, wherein if the first base station 105, 110 is at the first altitude 105, the second base station 150, 155 is at the second altitude 155, the WD 120, 130 is better served by the first base station 105 if the WD 120, 130 is at the first altitude 120, but it is better served by the second base station 155 if the WD 120, 130 is at the second altitude 130. When both the first 105, 110 and second 150, 155 base stations are at their respective first altitudes 105, 150, the WD 120, 130 at the first altitude 120 could be served by either one of them, at least based on their altitudes, but then other variables such as e.g. signal strength may also be used for determining which base station the first WD should connect to.

In LTE, the Automatic Neighbor Relation, ANR, function is used to manage neighbor relations, i.e. the relations between cells of base stations, and is used for optimizing handover performance. Each cell to which a base station provides radio coverage, has a list of neighbor relations, which is stored in a Neighbor Relation table, NRT, which is maintained by the base station of that cell. The NRT of a cell comprises information regarding neighboring cells, such as the Cell Global Identification, CGI, or extended CGI, eCGI, and the Physical Cell Identity, PCI, of the neighboring cells. Additionally, the NRT entry also comprises information about X2 availability, i.e. if eNBs are able to communicate directly with each other, whether the neighbor relation may be used for handover or not, and if the neighbor relation may be removed or changed by the Automatic Neighbor Relation, ANR, function. Furthermore, NRTs for different eNBs are generally maintained by an Operations and Management, O&M, node, such that each eNB typically reports any updates in its NRT to the corresponding O&M node.

The ANR function exists in LTE, and its objectives are to automatically add and remove entries to or from NRT. Additions to NRT are done by use of Radio Resource Control, RRC, signaling between the base station and WDs which provide measurement control and reporting means. Measurements of neighbor cells is defined by use of RRC, i.e. the WDs report measurement information to a base station serving the WD, and the WDs may also decode and report the unique CGI information of cells that belong to base stations which may be used for serving the WD, upon request by the base station. Depending on the measurements reported by the WDs, the ANR function may add new neighbor relations or remove existing neighbor relations.

Neighbor cell relations as used today is typically a function of the radio environment a WD operates in. In that context, shadow fading characteristics such as blocking or partial blocking from buildings, ground level topology and foliage are critical factors. As a consequence, the practical shadow fading and blocking environment, and to which extent that contributes to what cells are considered as neighboring cells, will differ depending on which height the WD is currently at, for example there is generally a big difference between being down on ground level and being above the rooftops. In a scenario where a WD goes over rooftops, other cell relations will be detected than which are typically identified on ground level.

Today, altitude information is not included in NRTs. However, by including altitude information of all involved entities, including both base stations and WDs, a better handling of connections between base stations and WDs may be achieved. As was described above in relation to FIG. 1, variations in altitude of a base station and/or of a WD, can affect to which base station it is most suitable for a WD to connect. If altitude information is included in the entries in NRT, it can be used to inform future handlings of connections between WDs and base stations.

Figure 3:
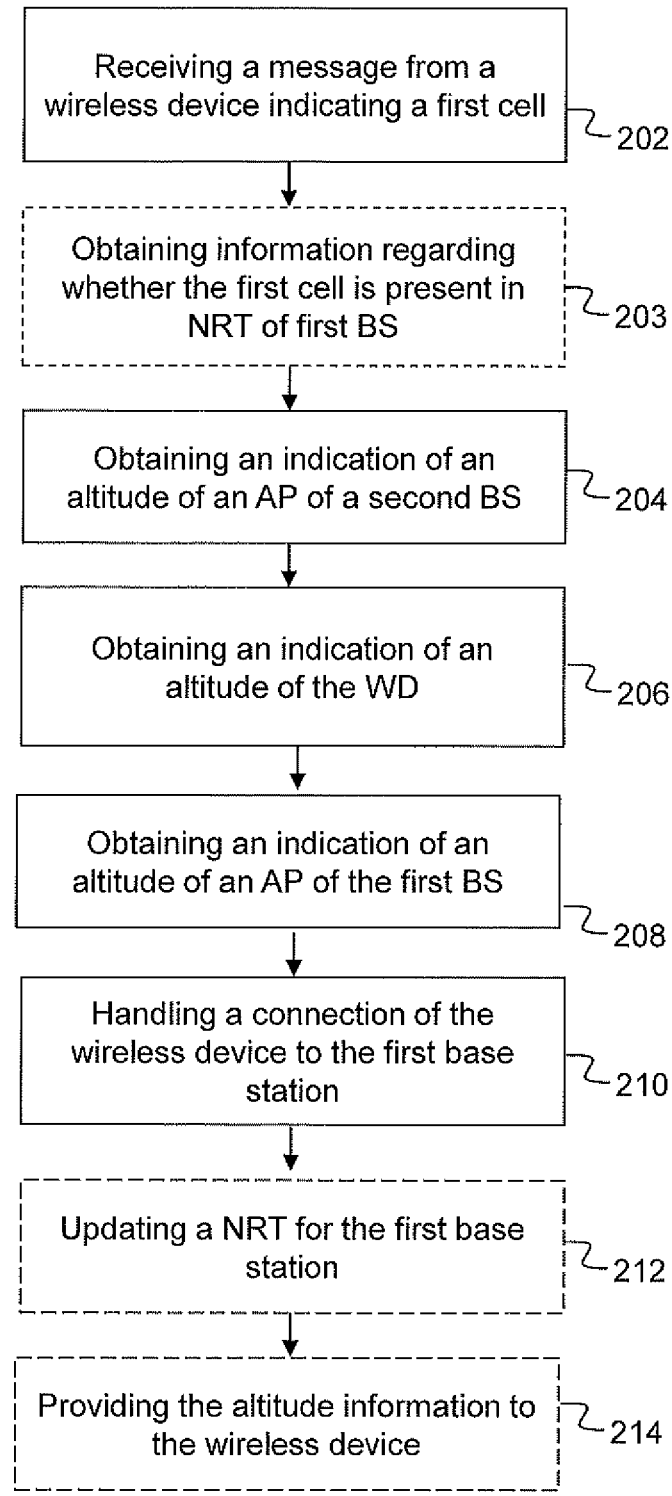
FIG. 3 is a flow chart schematically showing method steps of a first embodiment of a method in a first base station for handling connections of wireless devices.

FIG. 3, in conjunction with FIG. 1, shows an embodiment by a method performed by a first base station 10 in a wireless communications network 1. The first base station 10 comprises an AP providing radio coverage to a first cell 20 wherein the WD 50, 60 is located. The network further comprises a second base station 30 comprising an AP providing radio coverage to a second cell 40. The first 10 and second 30 base stations may in some embodiments have the capacity to change altitude, as shown in FIG. 2. The communications network 1 may further comprise additional base stations and WDs, as well as other nodes, such as an operations and management, O&M, node, to which the first and second base stations may be connected. The method comprises receiving 202 a message from the WD 50, 60 indicating the second cell 40. The indication of the second cell may comprise a cell ID of the second cell. The reason for the WD 120 detecting the second cell 40 may be that the first base station 10 instructed the WD to perform measurements on nearby cells. The method further comprises obtaining 204 an indication of an altitude the AP of the second base station 30, obtaining 206 an indication of an altitude of the WD 120, and obtaining 208 an indication of an altitude of the AP of the first base station 10. The method further comprises handling 210 a connection of the WD 50, 60 to the first base station 10 based on the altitude indication of the AP of the second base station 30, the altitude indication of the WD and the altitude indication of the AP of the first base station.

The step of handling 210 a connection of the WD to the first base station may in some embodiments comprise making a handover decision for the WD, based on the altitude indication of the WD, the altitude indication of the AP of the second base station, and the altitude indication of the AP of the first base station. By making a handover decision which takes the altitudes of the involved entities into account, a more resource efficient handling of connections between base stations and WDs may be achieved which minimizes unnecessary signaling in the communications network.

In some embodiments the step of handling 210 a connection of the WD to the first base station may comprise instructing the WD to not perform measurements on other base stations than the first base station. This may be relevant e.g. when the altitude information indicates that no other base stations are at an altitude suitable for serving the first WD, but wherein it may still be possible for the WD to detect signals from such base stations. In some embodiments, the step of handling 210 a connection of the WD to the first base station comprises instructing the WD to perform measurements on base stations other than the first and second base stations.

In some embodiments, the method may further comprise a step 203 of obtaining information regarding whether the second cell is present in a NRT of the first base station 10. The obtaining step 203 is typically performed after the receiving step 202, and in some embodiments the subsequent steps 204-214 are only performed in case the second cell is not already present in a NRT of the first base station. By only performing the subsequent steps when the second cell is not present in a NRT of the first base station 10, unnecessary signaling is avoided, since the first base station 10 may already have information regarding the relevant properties of the second cell. However, in case the second cell, or rather the AP of the second base station which provides radio coverage to the second cell, has the capacity to change altitude, it may be relevant to update the NRT of the first base station even if the second cell already has an entry in the NRT of the first base station, since the altitude information of the second cell may have changed. In some embodiments, if the second cell already has an entry in the NRT of the first base station, the method may comprise comparing the altitude indication of the AP of the second BS with the altitude indication of the second cell, or the altitude indication of the AP providing radio coverage to the second cell, which is stored in NRT, and only updating NRT if the altitude indication differs from information stored in NRT. In some embodiments, the NRT is updated if there is a large enough difference between the altitude indication and what is already stored in NRT, wherein a predetermined threshold may be used to determine if the difference is large enough. In some embodiments, such a threshold may be between 1 and 200 meters, such as 10 meters, 20 meters, 50 meters, 100 meters or 150 meters.

In some embodiments, the method may further comprise updating 212 a NRT of the first base station 10, based on the altitude indication of the WD, the altitude indication of the AP of the second base station and the altitude indication of the AP of the first base station. In some embodiments, the step 212 comprises updating the NRT of the first base station to comprise an altitude of the WD, an altitude of the AP of the second base station, and an altitude of the AP of the first base station, such that this data may be used for future decision making in the communications network. In some embodiments, the altitude stored is the same as the altitude contained in the altitude indication for the respective entity.

An example of an embodiment of a NRT for a base station according to the present disclosure is shown in FIG. 4, wherein BS1 denotes the first base station, BS2 denotes the second base station, and WD denotes the WD. "No remove" means that the neighbor relation cannot be removed from the NRT, "No HO" means that no handover may be performed for the entry, and "no X2" means that X2 communication may not be established. It should be noted that the entries shown in the NRT of FIG. 4 are used only for illustrative purposes, and does not necessarily constitute any useful or practically applicable cell relation settings.

In some embodiments, such as the one shown in FIG. 4, three different altitude ranges are predefined for the involved entities, namely ground altitude, intermediate altitude and high altitude. Which ranges are used may differ between embodiments, but as an example the ground level altitude range may be between 0 and 100 meters, the intermediate level may be 100 to 250 meters, and high may be 250 meters and above. As can be seen in FIG. 3, the NRT may be constructed such that a different set of neighbor relations are defined depending on the altitude on each of the three involved entities. The fields shown other than the altitude levels are the three standard fields used in NRT today, namely whether the cell relation is not to be removed, if no handover is to be performed, and if no X2 communication is allowed. As will be understood, depending on which information is used in ANR for handling NRTs, these fields may differ.

In some embodiments, more than three altitude intervals may be used. In some embodiments, two altitude intervals may be used. In some embodiments, the altitude intervals may be very fine grained such that each altitude has its own entry. In some embodiments, four different ranges may be used, wherein a first low range is between 0 and 50 meters, a second medium range is between 50 and 150 meters, a third high range is 150 to 300 meters, and a fourth extreme range is above 300 meters.

In some embodiments, the method may further comprise initiating an update of a NRT of the second base station, based on the altitude indication of the AP of the second base station, the altitude indication of the WD, and the altitude indication of the AP of the first base station. In some embodiments, initiating an update of a NRT of the second base station comprises the first base station instructing the second BS to update its NRT with the altitude indications already obtained. In some embodiments, initiating an update of a NRT of the second base station comprises providing the obtained altitude indications to the second BS, after which the second BS may update its own NRT.

In some embodiments, the method further comprises providing 214 the altitude indication of the AP of the first base station and the altitude indication of the AP of the second base station, to the WD. In some embodiments, the providing step 214 also comprises providing the altitude indication of the WD to the WD. By providing the altitude indications of these entities to the WD, the WD can communicate this information to other nodes in the communications network, such that they may also use it to improve handling of connections as well.

The terms "altitude indication" and "indication of an altitude" are used interchangeably throughout this disclosure, and both are intended to denote an indication related to the altitude of an entity involved in the communications network. In some embodiments, the altitude indication comprises the current altitude. In some embodiments, it comprises the predicted altitude at a future point in time, such as the time when a handover is intended to take place. In some embodiments, the altitude indication may comprise a rate of change of altitude as well as the current altitude.

Figure 5:
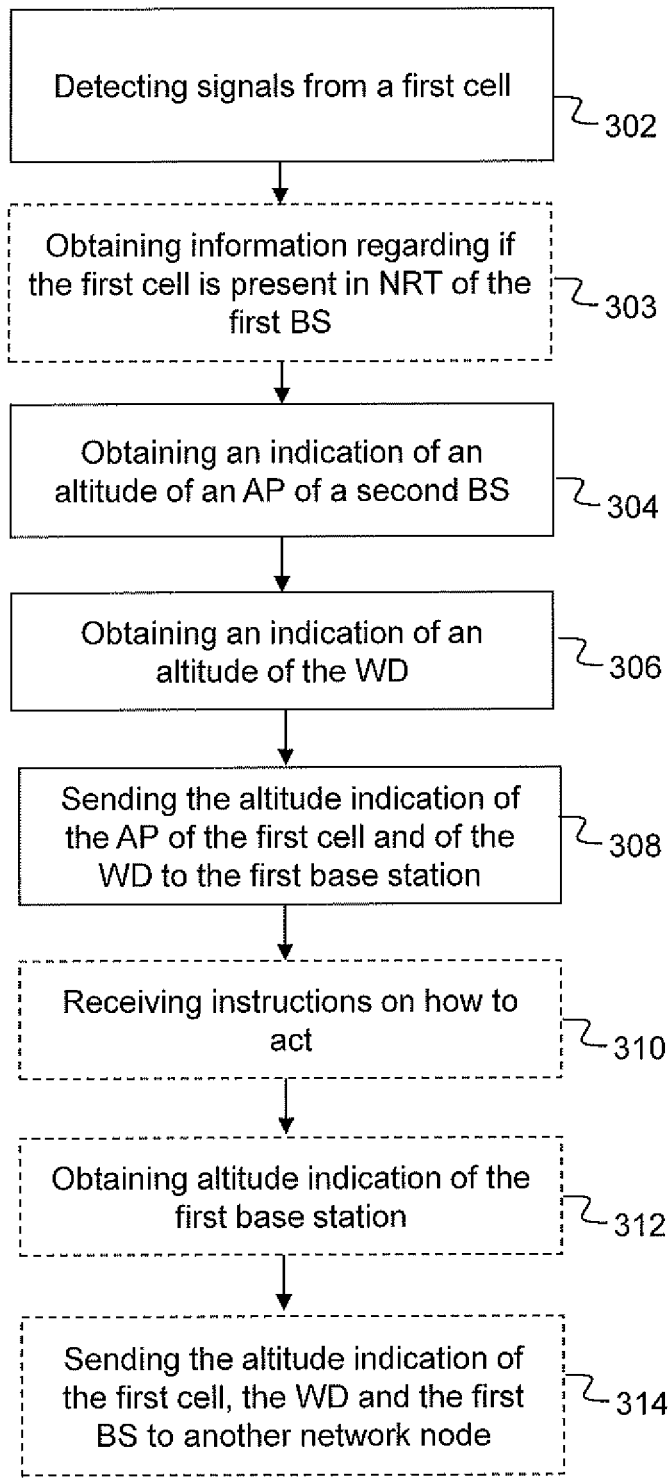
FIG. 5 is a flow chart schematically shows method steps of a second embodiment of a method for handling connections, performed by a wireless device.

FIG. 5, in conjunction with FIG. 1. shows an embodiment of a method performed by a WD 120 of a communications network 1, the communications network 1 comprising a first base station 10, to which the WD is connected. The first base station comprises an AP providing radio coverage to a first cell 20 wherein the WD 50, 60 is located. The network further comprises a second base station 30 comprising an AP providing radio coverage to a second cell 40. The first 10 and second 30 base stations may in some embodiments have the capacity to change altitude, as shown in FIG. 2. The communications network 1 may further comprise additional base stations and WDs, as well as other nodes such as an operations and management, O&M, node, to which the first and second base stations may be connected.

The method comprises detecting 302 signals from the second cell. The WD 120 may have been previously instructed by the first BS 10 to perform measurements on base stations other than the first base station 10. After signals have been detected from the second cell, the method comprises a step of obtaining 204 an indication of an altitude of the AP of the second base station. The method further comprises obtaining 306 an indication of an altitude of the WD. In some embodiments, the WD may have to capacity to determine or obtain its own altitude, and then the obtaining step 306 may comprise that the WD determines or obtains its own altitude and sends it to the first base station 10. In some embodiments, the altitude of the WD may be determined by the first base station 10, and the obtaining step 306 may then comprise the WD obtaining information regarding its own altitude from the first base station 10. The method further comprises sending 308 the altitude indication of the AP of the second base station and the altitude indication of the WD to the first base station 10. By sending 308 this information to the first base station 10, the first base station 10 has information regarding the altitude of the AP of the second BS and the altitude of the WD, and can use this information to make better informed decisions. Further, the first base station 10 generally has information regarding its own altitude, and/or the capacity to determine or obtain its own altitude. In some embodiments, the first base station 10 determining or obtaining its own altitude, or the altitude of the AP of the first base station, comprises retrieving information stored in the first base station 10 regarding its own altitude. In some embodiments, it comprises using data from altitude sensors in order to determine its own altitude. By the first BS 10 having information regarding the altitude of the AP of the first base station, the altitude of the AP of the second base station, and the altitude of the WD, the first BS 10 may use this information to improve decision making in the communications network, such as when making handover decision for the WD 120. Thus, after the WD sending 308 the altitude indication of the AP of the second base station and the altitude indication of the WD 120 to the first BS 10, the first BS 10 has information regarding the altitude of the AP of the first BS, the AP of the second BS, and of the WD 120.

In some embodiments, the method performed by the WD 120 may comprise a step 303 of obtaining information regarding whether the second cell is present in a NRT of the first BS. The obtaining step 303 is typically performed after the detecting step 302, and before the obtaining step 304. In some embodiments, the subsequent steps of the method 304-314 are only performed in case the second cell is not already present in the NRT of the first BS 10. In some embodiments, the step 303 comprises the WD requesting information from the first base station 10 regarding if the second cell is present in the NRT of the first base station 10 or not.

In some embodiments, the method may comprise a step 310 of receiving instructions on how to act from the first BS 10, based on the altitude indication of the AP of the second BS, the altitude indication of the WD 120, and an altitude indication of the AP of the first BS 10 providing radio coverage to the WD. Even though the WD does not obtain information regarding the altitude of the first BS, the first BS has the capacity to determine such information, and thus the instructions on how to act may be based on the altitude indication of the AP of the first BS as well as on the altitude indications of the WD 120 and of the AP of the second BS 30.

The step of receiving 310 instructions on how to act may comprise receiving instructions regarding a movement of the connection of the WD 50, 60 from the first base station 10 to the second base station 30, based on the received altitude indications. Such a movement may comprise the base station 10 making a handover decision for the WD 50, 60 to move its connection from the first base station 10 to the second base station and communicating this to the WD 50, 60, or it may comprise the WD 50, 60 making a cell selection decision to move its connection from the first base station 10 to the second base station 30. In some embodiments, the receiving step 310 may comprise receiving instructions regarding staying connected to the first base station 10. In some embodiments, the step 310 may comprise receiving instructions regarding not performing any measurements on any cells. In some embodiments, step 310 may comprise receiving instructions regarding performing measurements on cells other than the first and second cell.

In some embodiments, the method may comprise a step 312 of obtaining an altitude indication of the AP of the first BS 10. In some embodiments, the WD 120 does not need information regarding the altitude of the AP of the first BS, since it is generally not the WD 120 making decisions based on this information. However, by having a step 310 of obtaining the altitude indication of the AP of the first BS, the WD 120 can provide this information to other nodes in the network, such as the second base station 30, or other base stations in the wireless communications network 100.

In embodiments comprising the obtaining step 310, the method may further comprise a step 314 of sending the altitude indication of the AP of the first BS of the first BS, the altitude indication of the AP of the second BS, and the altitude indication of the WD to another network node, such that the altitude indications may be used by such network nodes to make better informed decisions in the future. For example, other network nodes which also have neighbor relations with the first and second base stations, may update the entries related to the first and second BS in their NRTs, such as entries comprising the altitude of the first and second BSs.

Figure 6:
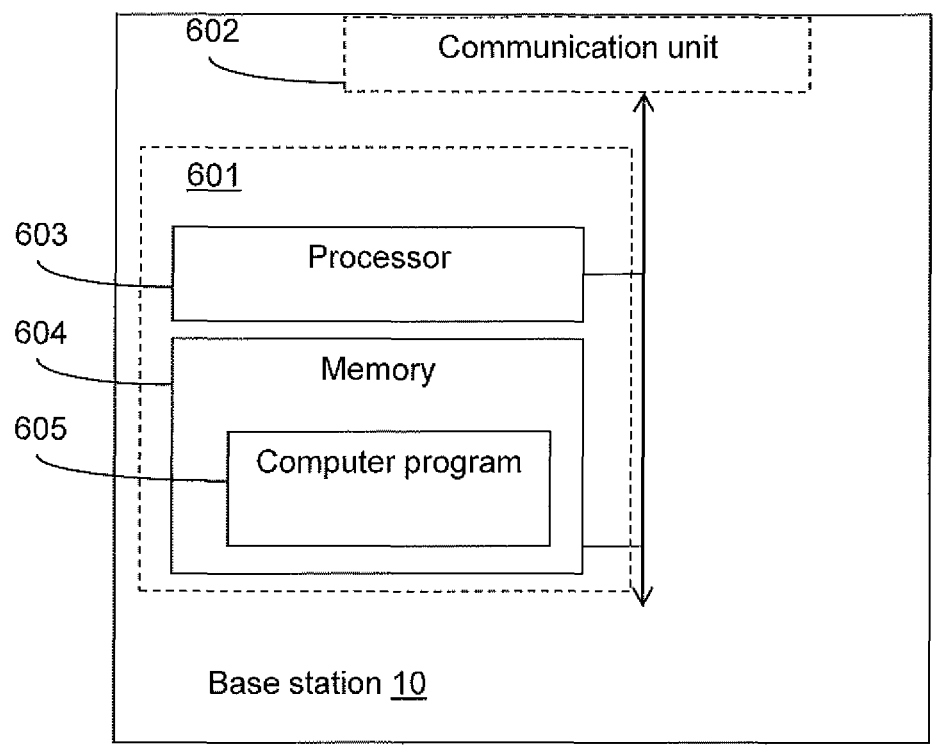
FIG. 6 is a block schematic of a first base station according to an embodiment.

FIG. 6, in conjunction with FIG. 1, shows a first base station 10, operable for wireless communication with a WD 50, 60, wherein the first base station 10 comprises an AP providing radio coverage to a cell 20 in which the WD 50, 60 is located, wherein the base station 10 is connected to a wireless communications network 1, the wireless communications network further comprising a second base station 30 comprising an AP providing radio coverage to a second cell 40. The wireless communications network may further comprise an Operations and Management, O&M, node. The base station 10 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the base station 10 is operative for receiving a message from the WD 50, 60 indicating the second cell 40. The first base station 10 is further operative for obtaining an indication of an altitude the AP of the second base station 30, obtaining an indication of an altitude of the WD 120, and obtaining an indication of an altitude of the AP of the first base station 10. The first base station 10 is further operative for handling a connection of the WD 50, 60 to the first base station 10 based on the altitude indication of the AP of the second base station 30, the altitude indication of the WD and the altitude indication of the AP of the first base station.

According to an embodiment, the base station 10 is operative for making a handover decision for the WD, based on the altitude indication of the WD, the altitude indication of the AP of the second base station, and the altitude indication of the AP of the first base station.

According to an embodiment, the base station 10 is operative for instructing the WD to not perform measurements on other base stations than the first base station. According to another embodiment, the base station 10 is operative for instructing the WD to perform measurements on base stations other than the first and second base stations.

According to an embodiment, the base station 10 is operative for obtaining information regarding whether the second cell is present in a NRT of the first base station 10. The obtaining step is typically performed after the receiving step, and in some embodiments the subsequent steps are only performed in case the second cell is not already present in a NRT of the first base station According to an embodiment, the base station 10 is operative for updating a NRT of the first base station 10, based on the altitude indication of the WD, the altitude indication of the AP of the second base station and the altitude indication of the AP of the first base station. According to an embodiment, the base station 10 is operative for updating the NRT of the first base station to comprise an altitude of the WD, an altitude of the AP of the second base station, and an altitude of the AP of the first base station.

According to an embodiment, the base station 10 is operative for initiating an update of a NRT of the second base station, based on the altitude indication of the AP of the second base station, the altitude indication of the WD, and the altitude indication of the AP of the first base station.

According to an embodiment, the base station 10 is operative for providing the altitude indication of the AP of the first base station and the altitude indication of the AP of the second base station, to the WD. In some embodiments, the providing step 214 also comprises providing the altitude indication of the WD to the WD According to other embodiments, the base station 10 may further comprise a communication unit 602, which may be considered to comprise conventional means for communicating with the WD 50, 60. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in a base station 10 causes the base station 10 to perform the steps described in any of the described embodiments of the base station 10. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the base station configured for airborne use 155 has access via the communication unit 602. The computer program may then be downloaded from the server into the memory 604.

Figure 7:
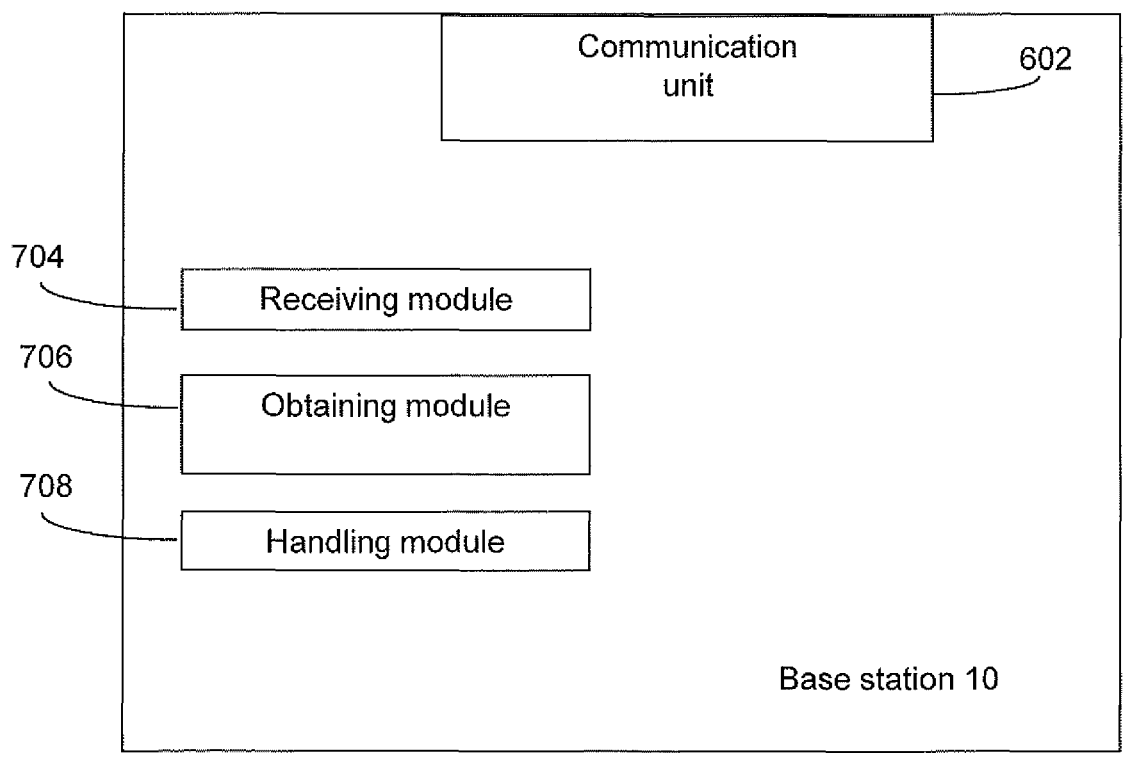
FIG. 7 shows a block schematic of a first base station according to another embodiment.

FIG. 7, in conjunction with FIG. 1, shows an alternative embodiment of a first base station 10, wherein the first base station 10 is operable for wireless communication with a wireless device 50, 60, wherein the first base station 10 comprises an AP providing radio coverage to a first cell 20 in which the WD 50, 60 is located, wherein the base station 10 is connected to a wireless communications network 1, the wireless communications network further comprising a second base station 30 comprising an AP providing radio coverage to a second cell 40. The base station 10 comprises a receiving module 704 for receiving, from the WD, a message indicating the second cell 40. The base station 10 further comprises an obtaining module 706 for obtaining an indication of an altitude of the AP of the second base station 30, obtaining an indication of an altitude of the WD 50,60, and obtaining an indication of an altitude of the AP of the first base station 10. The base station 10 further comprises a handling module 708 for handling a connection of the WD to the first base station, based on the altitude indication of the AP of the second base station 30, the altitude indication of the WD 50, 60, and the altitude indication of the AP of the first base station 10. The base station 10 may further comprise a communication unit 602 similar to the communication unit of FIG. 6. In some embodiments, the modules 704, 706, 708, 602 are implemented as a computer program running on processing circuitry such as a processor.

Figure 8:
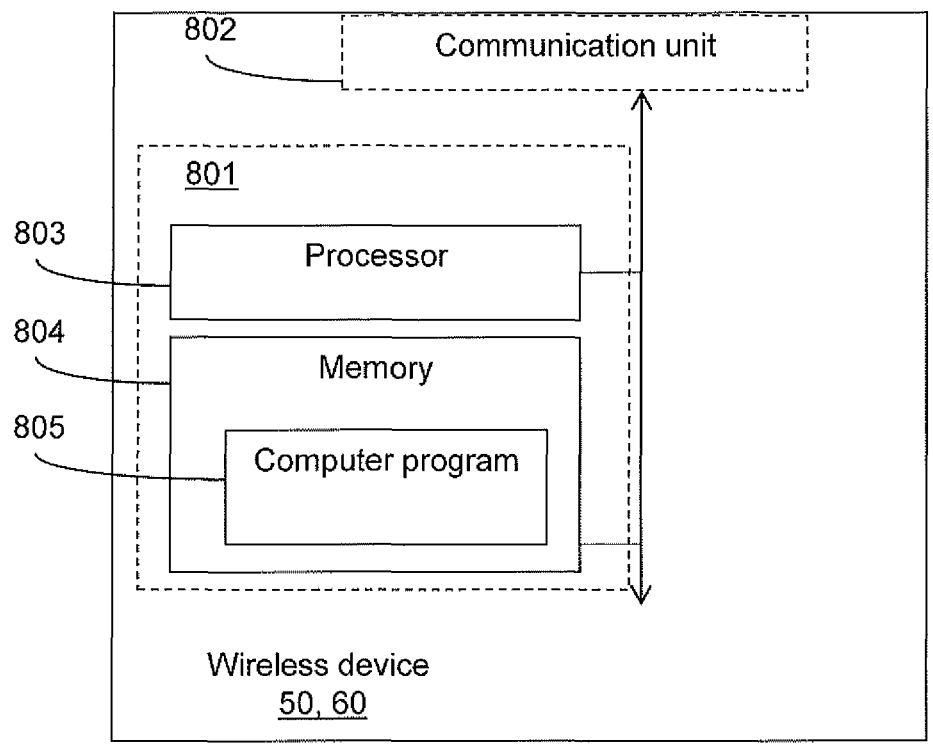
FIG. 8 shows a block schematic of a wireless device according to an embodiment.

FIG. 8, in conjunction with FIG. 1, shows a wireless device 50,60, operable for wireless communication with a first base station 10 having an access providing radio coverage to a cell 20 in which the WD 50, 60 is located, wherein the first base station 10 is and the WD 50, 60 are connected to a wireless communications network 1. The wireless communications network further comprises a second base station 30 comprising an AP providing radio coverage to a second cell 40. The wireless communications network may further comprise an Operations and Management, O&M, node. The WD 50, 60 comprises processing circuitry 803 and a memory 804. The processing circuitry 803 may comprise one or more programmable processors, application-specific integrated circuits, field programmable gate arrays or combinations of these (not shown) adapted to execute instructions. The memory contains instructions executable by said processing circuitry, whereby the WD 50, 60 is operative for detecting signals from the second cell. The WD, 60 is further operative for obtaining an indication of an altitude of the AP of the second base station, obtaining an indication of an altitude of the WD, and for sending the altitude indication of the AP of the second base station and the altitude indication of the WD to the first base station 10.

According to an embodiment, the WD 50, 60 is operative for receiving instructions on how to act from the first BS 10, based on the altitude indication of the AP of the second BS, the altitude indication of the WD 120, and an altitude indication of the AP of the first BS 10 providing radio coverage to the WD According to an embodiment, the WD 50, 60 is operative for receiving instructions regarding a possible movement of the connection of the WD 50, 60 from the first base station 10 to the second base station 30, based on the received altitude indications. Such a possible movement may comprise the base station 10 making a handover decision for the WD 50, 60 to move its connection from the first base station 10 to the second base station and communicating this to the WD 50, 60, or it may comprise the WD 50, 60 making a cell selection decision to move its connection from the first base station 10 to the second base station 30. In some embodiments, the receiving step may comprise receiving instructions regarding staying connected to the first base station 10. In some embodiments, the receiving step may comprise receiving instructions regarding not performing any measurements on any cells. In some embodiments, the receiving step may comprise receiving instructions regarding performing measurements on cells other than the first and second cell.

According to an embodiment, the WD 50, 60 is operative for obtaining an altitude indication of the AP of the first BS 10. According to an embodiment, the WD 50, 60 is operative for sending the altitude indication of the AP of the first BS 10, the altitude indication of the AP of the second BS 30, and the altitude indication of the WD 50, 60 to another network node, such as an O&M node, such that the altitude indications may be used by such network nodes to make better informed decisions in the future.

According to other embodiments, the WD 50, 60 may further comprise a communication unit 802, which may be considered to comprise conventional means for communication with the first base station 10 well as for communicating with other base stations, such as the second base station 30. The communication unit 802 may for this reason comprise transmitting units for transmitting wireless signals and receiving units for receiving wireless signals. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

The computer program 805 may comprise computer readable code means, which when run in the WD 50, 60 causes the WD to perform the steps described in any of the described embodiments of the WD. The computer program 805 may be carried by a computer program product connectable to the processing circuitry 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the WD has access via the communication unit 802. The computer program may then be downloaded from the server into the memory 804.

Figure 10:
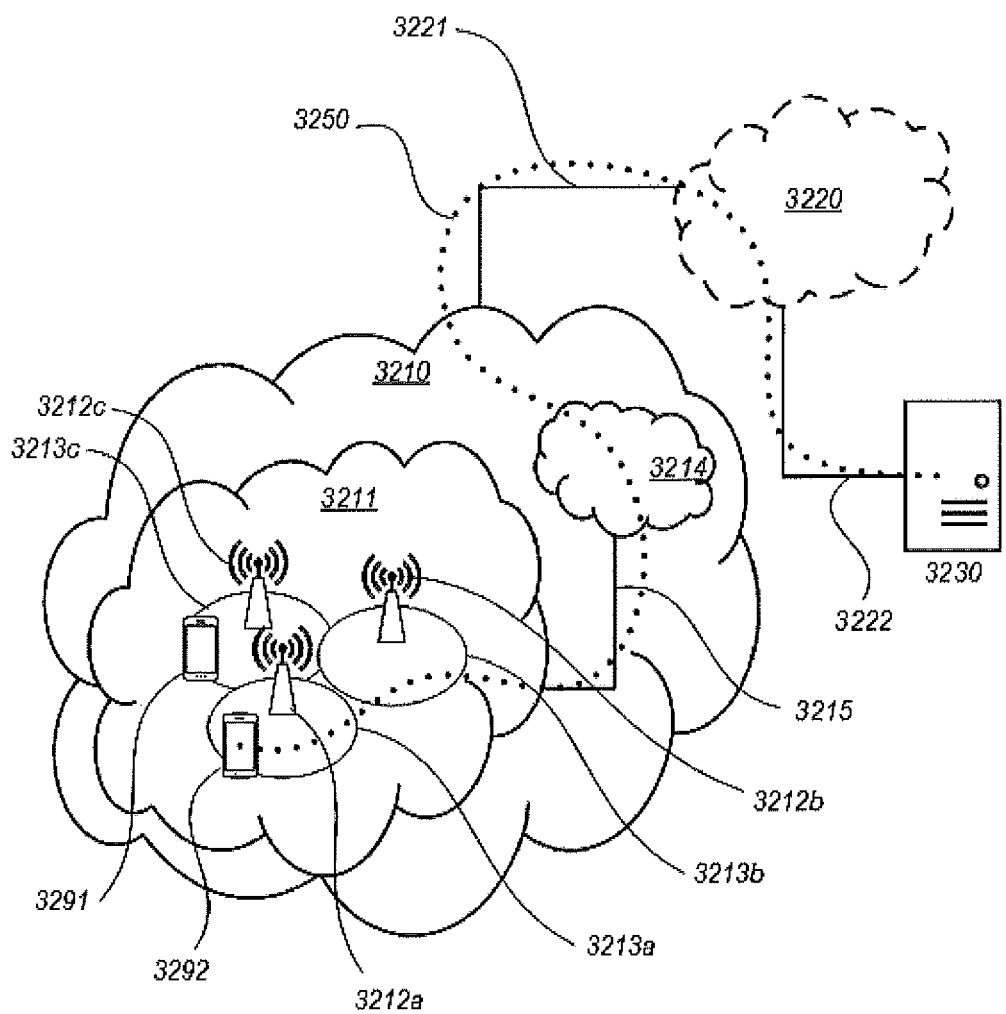
FIG. 10 schematically illustrates a telecommunication network connected via an intermediate network to a host computer.

FIG. 10, in conjunction with FIG. 1, shows an alternative embodiment of a wireless device operable for wireless communication with a first base station 10 having an access providing radio coverage to a cell 20 in which the WD 50, 60 is located, wherein the first base station 10 is and the WD 50, 60 are connected to a wireless communications network 1. The wireless communications network further comprises a second base station 30 comprising an AP providing radio coverage to a second cell 40. The wireless communications network may further comprise an Operations and Management, O&M, node. The WD 50, 60 comprises a detecting module 904 for detecting signals from the second cell 40. The WD 50, 60 further comprises an obtaining module 906 for obtaining an indication of an altitude of the AP of the second base station 30, and for obtaining an indication of an altitude of the WD. The WD 50, 60 further comprises a sending module 908 for sending the altitude indication of the AP of the second base station 10 and the altitude indication of the WD 50, 60 to the first base station 10.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless APs, each defining a corresponding coverage area 3213*a*, 3213*b*, 3213*c*. Each base station 3212*a*, 3212*b*, 3212*c* is connectable to the core network 3214 over a wired or wireless connection 3215. A first WD (WD) 3291 located in coverage area 3213*c* is configured to wirelessly connect to, or be paged by, the corresponding base station 3212*c*. A second WD 3292 in coverage area 3213*a* is wirelessly connectable to the corresponding base station 3212*a*. While a plurality of UEs 3291, 3292 are illustrated in this example, the disclosed embodiments are equally applicable to a situation where a sole WD is in the coverage area or where a sole WD is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected WD 3291. Similarly, the base station 3212 need not be aware of the future routing of an outgoing uplink communication originating from the WD 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a WD 3330 connecting via an OTT connection 3350 terminating at the WD 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the WD 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a WD 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the WD 3330 already referred to. Its hardware 3335 may include a radio interface 3337 configured to set up and maintain a wireless connection 3370 with a base station serving a coverage area in which the WD 3330 is currently located. The hardware 3335 of the WD 3330 further includes processing circuitry 3338, which may comprise one or more programmable processors, application-specific integrated circuits, field programmable gate arrays or combinations of these (not shown) adapted to execute instructions. The WD 3330 further comprises software 3331, which is stored in or accessible by the WD 3330 and executable by the processing circuitry 3338. The software 3331 includes a client application 3332. The client application 3332 may be operable to provide a service to a human or non-human user via the WD 3330, with the support of the host computer 3310. In the host computer 3310, an executing host application 3312 may communicate with the executing client application 3332 via the OTT connection 3350 terminating at the WD 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
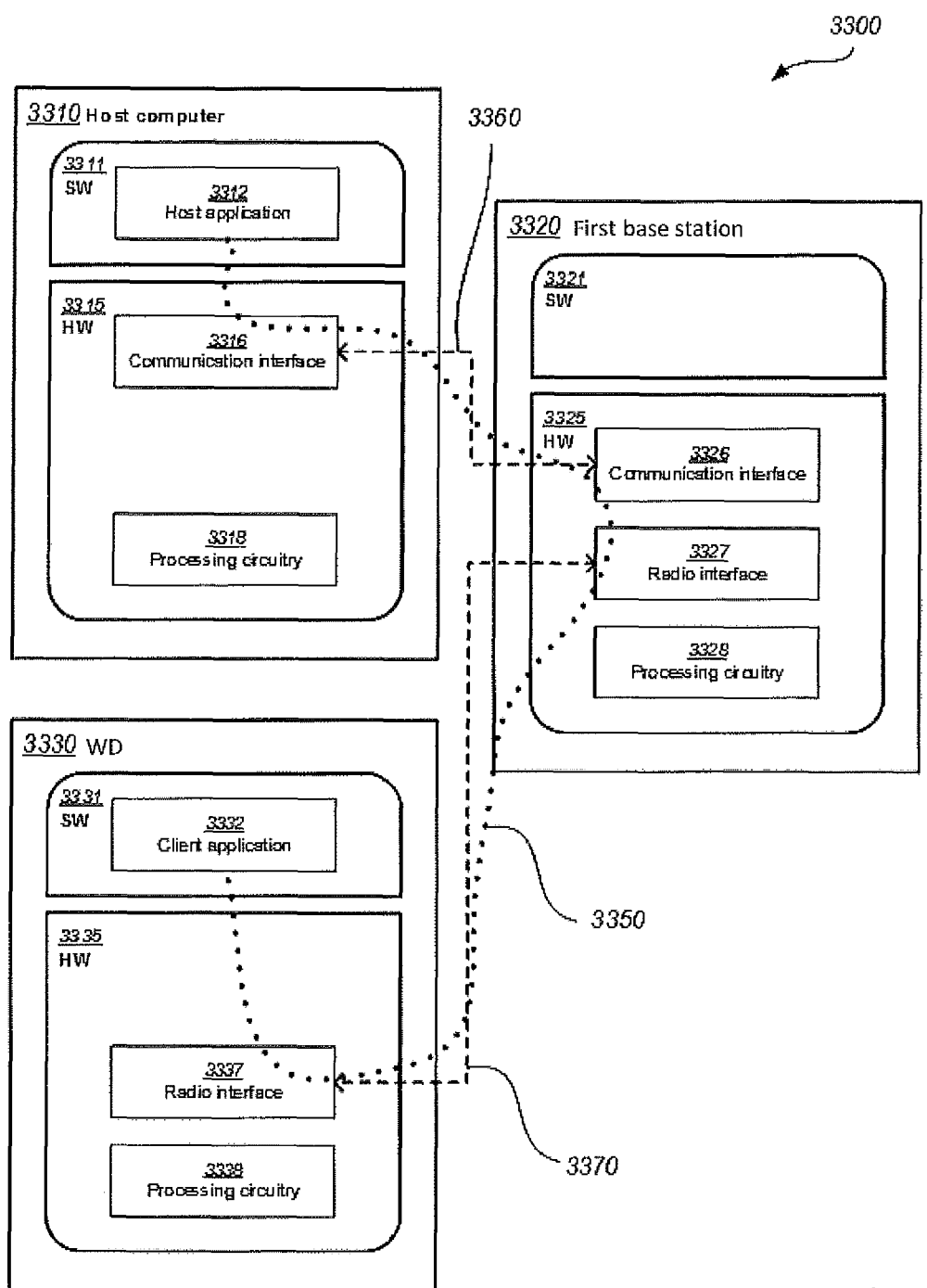
FIG. 11 is a generalized block diagram of a host computer communicating via a first base station with a wireless device over a partially wireless connection.

It is noted that the host computer 3310, base station 3320 and WD 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the WD 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the WD 3330 and the base station 3320 is in accordance with the teachings of the embodiments described throughout this disclosure. One or more of the various embodiments improve the performance of OTT services provided to the WD 3330 using the OTT connection 3350, in which the wireless connection 3370 forms the last segment. More precisely, the teachings of these embodiments may improve the latency and power consumption and thereby provide benefits such as reduced user waiting time and extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and WD 3330, in response to variations in the measurement results. The measurement procedure and/or the network functionality for reconfiguring the OTT connection 3350 may be implemented in the software 3311 of the host computer 3310 or in the software 3331 of the WD 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary WD signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 12, 13:
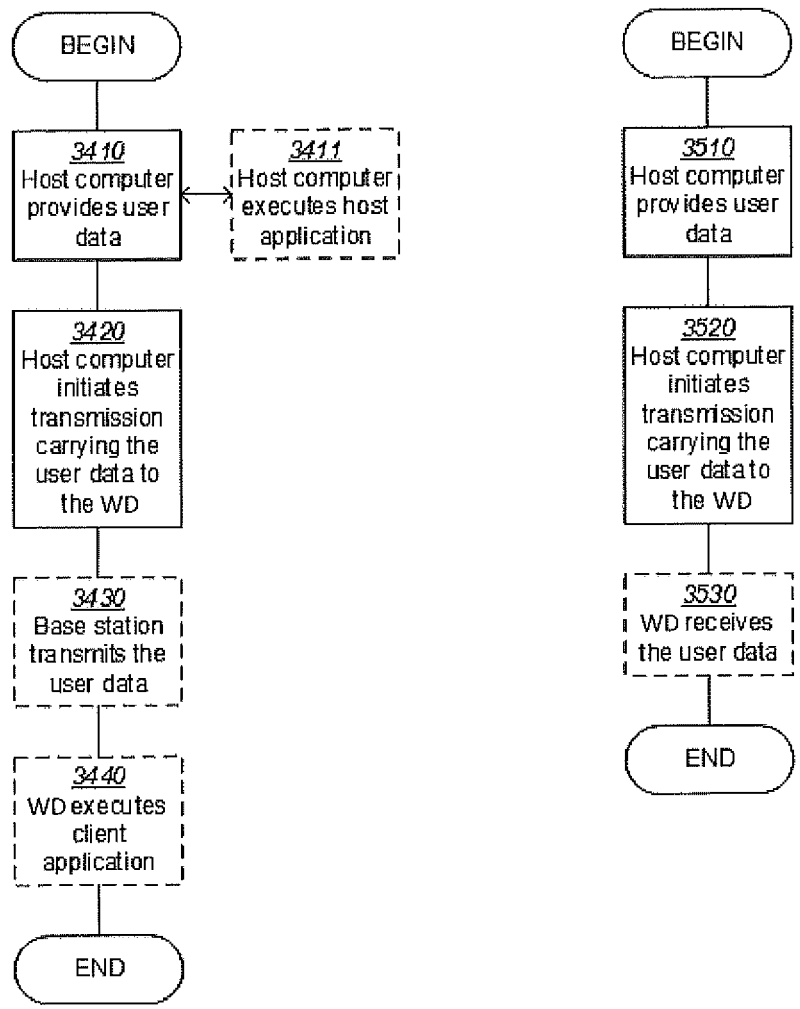

FIG. 12 is a flowchart illustrating a method implemented in a communication system, in accordance with one embodiment. The communication system includes a host computer, a base station and a WD which may be those described with reference to FIGS. 32 and 33. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the WD the user data which was carried in the transmission that the host computer initiated, in accordance with the teachings of the embodiments described throughout this disclosure. In an optional fourth step 3440, the WD executes a client application associated with the host application executed by the host computer.

FIG. 13 is a flowchart illustrating a method implemented in a communication system, in accordance with one embodiment. The communication system includes a host computer, a base station and a WD which may be those described with reference to FIGS. 32 and 33. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the WD receives the user data carried in the transmission.

FIG. 14 is a flowchart illustrating a method implemented in a communication system, in accordance with one embodiment. The communication system includes a host computer, a base station and a WD which may be those described with reference to FIGS. 32 and 33. For simplicity of the present disclosure, only drawing references to FIG. 14 will be included in this section. In an optional first step 3610 of the method, the WD receives input data provided by the host computer. Additionally or alternatively, in an optional second step 3620, the WD provides user data. In an optional substep 3621 of the second step 3620, the WD provides the user data by executing a client application. In a further optional substep 3611 of the first step 3610, the WD executes a client application which provides the user data in reaction to the received input data provided by the host computer. In providing the user data, the executed client application may further consider user input received from the user. Regardless of the specific manner in which the user data was provided, the WD initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a WD which may be those described with reference to FIGS. 32 and 33. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Figure 9:
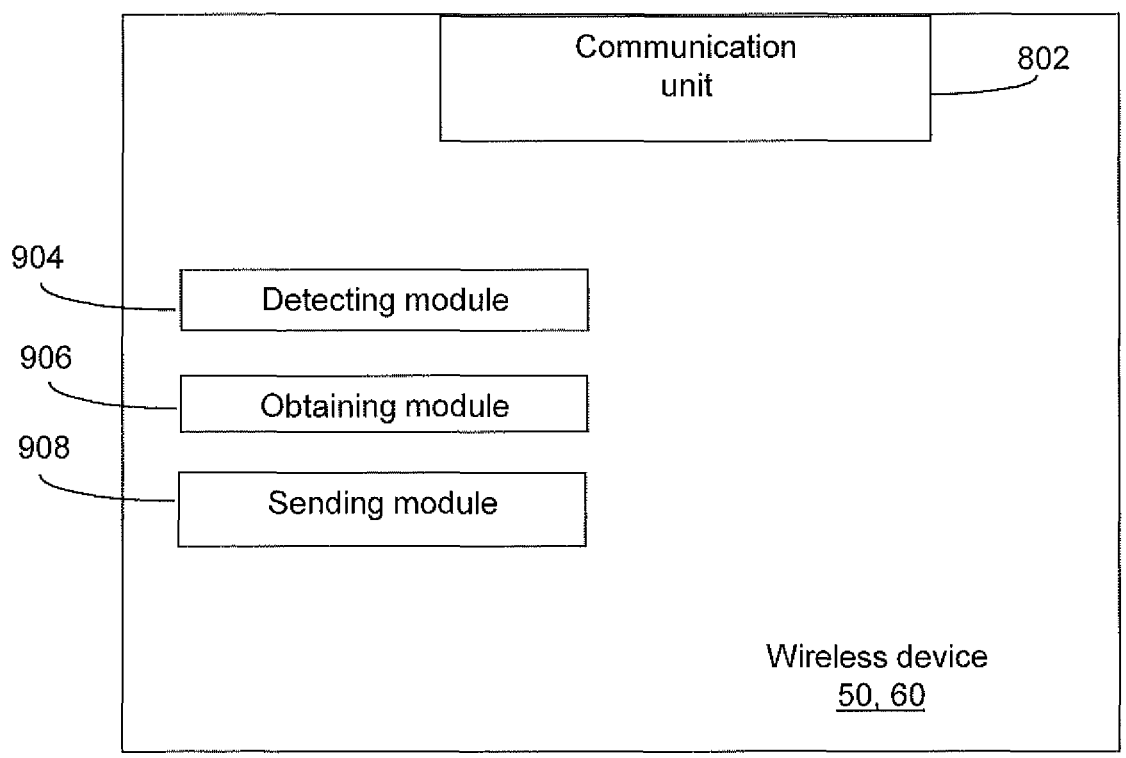
FIG. 9 shows a block schematic of a wireless device according to another embodiment.

More possible embodiments will now be described. Embodiments 5-36 represent a downstream aspect of the radio-related invention, and embodiments 45-77 represent an upstream aspect of the radio-related invention. In addition to the embodiments described below, optional embodiments similar to the embodiments for the first base station of FIGS. 6 and 7, and the embodiments for the WD of FIGS. 8 and 9, may also be applicable to the below described embodiments. The base station referenced above in reference to FIGS. 10-15 and in the embodiments below may be the first base station of the first aspect of the invention. The numbered embodiments below may be implemented in wireless communications networks similar to the ones described in relation to aspects of the invention. for example, the wireless communications network may comprise a first base station having an AP providing radio coverage to a first cell, and a second base station having an AP providing radio coverage to a second cell.

Numbered Embodiments

5. A communication system including a host computer comprising:
processing circuitry configured to provide user data; and
a communication interface configured to forward the user data to a cellular network for transmission to a wireless device (WD),
wherein the cellular network comprises a base station having a radio interface and processing circuitry, the base station's processing circuitry configured for:

receiving a message from the WD indicating the second cell;
obtaining an indication of an altitude of the access point of the second base station; and
obtaining an indication of an altitude of the WD;
obtaining an indication of an altitude of the access point of the first base station, and
handling a connection of the WD to the first base station based on the altitude indication of the access point of the second base station, the altitude indication of the WD, and the altitude indication of the access point of the first base station.

6. The communication system of embodiment 5, further including the base station.

7. The communication system of embodiment 6, further including the UE, wherein the WD is configured to communicate with the base station.

8. The communication system of embodiment 7, wherein:
the processing circuitry of the host computer is configured to execute a host application, thereby providing the user data; and
the WD comprises processing circuitry configured to execute a client application associated with the host application.

15. A method implemented in a communication system including a host computer,
a base station and a wireless device (WD), the method comprising:
at the host computer, providing user data; and
at the host computer, initiating a transmission carrying the user data to the WD via a cellular network comprising the base station, wherein the base station receives a message from the WD indicating the second cell, obtains an indication of an altitude of the access point of the second base station, obtains an indication of an altitude of the WD, obtains an indication of an altitude of the access point of the first base station, and handles a connection of the WD to the first base station based on the altitude indication of the access point of the second base station, the altitude indication of the WD, and the altitude indication of the access point of the first base station.

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

25. A communication system including a host computer comprising:
processing circuitry configured to provide user data; and
a communication interface configured to forward user data to a cellular network for transmission to a wireless device (WD),
wherein the WD comprises a radio interface and processing circuitry, the UE's processing circuitry configured for:
detecting signals from the second cell;
obtaining an indication of an altitude of the access point of the second base station;
obtaining an indication of an altitude of the WD;
sending the altitude indication of the access point of the second base station and the altitude indication of the WD to the first base station.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

35. A method implemented in a communication system including a host computer, a base station and a wireless device (WD), the method comprising:
at the host computer, providing user data; and
at the host computer, initiating a transmission carrying the user data to the WD via a cellular network comprising the base station, wherein the WD
detects signals from the second cell;
obtains an indication of an altitude of the access point of the second base station;
obtains an indication of an altitude of the WD;
sends the altitude indication of the access point of the second base station and the altitude indication of the WD to the first base station.

36. The method of embodiment 35, further comprising:
at the UE, receiving the user data from the base station.

45. A communication system including a host computer comprising:
a communication interface configured to receive user data originating from a transmission from a wireless device (WD) to a base station,
wherein the WD comprises a radio interface and processing circuitry, the UE's processing circuitry configured for:
detecting signals from the second cell;
obtaining an indication of an altitude of the access point of the second base station;
obtaining an indication of an altitude of the WD;
sending the altitude indication of the access point of the second base station and the altitude indication of the WD to the first base station.

46. The communication system of embodiment 45, further including the UE.

47. The communication system of embodiment 46, further including the base station, wherein the base station comprises a radio interface configured to communicate with the WD and a communication interface configured to forward to the host computer the user data carried by a transmission from the WD to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

52. The method of embodiment 51, further comprising:
providing user data; and
forwarding the user data to a host computer via the transmission to the base station.

55. A method implemented in a communication system including a host computer, a base station and a wireless device (WD), the method comprising:
at the host computer, receiving user data transmitted to the base station from the UE, wherein the UE:
detects signals from the second cell;
obtains an indication of an altitude of the access point of the second base station;
obtains an indication of an altitude of the WD;
sends the altitude indication of the access point of the second base station and the altitude indication of the WD to the first base station.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application, wherein the user data to be transmitted is provided by the client application in response to the input data.

65. A communication system including a host computer comprising a communication interface configured to receive user data originating from a transmission from a wireless device (WD) to a base station, wherein the base station comprises a radio interface and processing circuitry, the base station's processing circuitry configured for:
receiving a message from the WD indicating the second cell;
obtaining an indication of an altitude of the access point of the second base station; and
obtaining an indication of an altitude of the WD;
obtaining an indication of an altitude of the access point of the first base station, and
handling a connection of the WD to the first base station based on the altitude indication of the access point of the second base station, the altitude indication of the WD, and the altitude indication of the access point of the first base station.

66. The communication system of embodiment 65, further including the base station.

67. The communication system of embodiment 66, further including the UE, wherein the WD is configured to communicate with the base station.

68. The communication system of embodiment 67, wherein:
the processing circuitry of the host computer is configured to execute a host application;
the WD is configured to execute a client application associated with the host application, thereby providing the user data to be received by the host computer.

75. A method implemented in a communication system including a host computer, a base station and a wireless device (WD), the method comprising:
at the host computer, receiving, from the base station, user data originating from a transmission which the base station has received from the UE, wherein the base station receives a message from the WD indicating the second cell;
obtains an indication of an altitude of the access point of the second base station; and
obtains an indication of an altitude of the WD;
obtains an indication of an altitude of the access point of the first base station, and
handles a connection of the WD to the first base station based on the altitude indication of the access point of the second base station, the altitude indication of the WD, and the altitude indication of the access point of the first base station.

76. The method of embodiment 75, further comprising: at the base station, receiving the user data from the UE.

77. The method of embodiment 76, further comprising:
at the base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the example figures, a broken line generally signifies that the feature within the broken line is optional.

The invention claimed is:

1. A method performed by a first base station of a wireless communications network, the first base station comprising a first access point providing radio coverage to a first cell, the wireless communications network further comprising a second base station having second access point providing radio coverage to a second cell, wherein a wireless device (WD) is located within the first cell and is connected to the first base station, the method comprising:
   receiving a message from the WD indicating the second cell;
   obtaining an indication of an altitude of the second access point of the second base station;
   obtaining an indication of an altitude of the WD;
   obtaining an indication of an altitude of the first access point of the first base station;
   determining whether the WD should refrain from performing measurements of the second cell, wherein the determination is based on the altitude of the WD, the altitude of the first access point, and altitude of the second access point; and
   as a result of determining that the WD should refrain from performing measurements of the second cell, transmitting to the WD a message for configuring the WD to refrain from performing measurements of the second cell.

2. The method of claim 1, further comprising the step of: obtaining information regarding whether the first cell is present in a Neighbor Relation Table (NRT) of the first base station.

3. The method of claim 1, wherein handling a connection of the WD to the first base station comprises:
   making a handover decision for the WD based on the altitude indication of the second access point, the altitude indication of the WD, and the altitude indication of the first access point.

4. The method of claim 1, further comprising:
updating a neighbor relation table (NRT) of the first base station based on the altitude indication of the second access point, the altitude indication of the WD, and the altitude indication of the first access point.

5. The method of claim 4, wherein the updating comprises updating the NRT of the first base station to comprise an altitude of the first access point and an altitude of the second base station.

6. The method of claim 1, further comprising:
initiating an update of a NRT of the second base station, based on the altitude indication of the second access point, the altitude indication of the WD, and the altitude indication of the first access point.

7. The method of claim 1, further comprising:
providing, to the WD, the altitude indication of the second access point and the altitude indication of the first access point.

8. The method of claim 1, wherein the step of determining whether the WD should refrain from performing measurements of the second cell based on the altitude of the WD, the altitude of the first access point, and altitude of the second access point comprises:
using information indicating the altitude of the WD, the altitude of the first access point, and altitude of the second access point to obtain handover information from a neighbour relation table (NRT); and
determining whether the WD should refrain from performing measurements of the second cell based on the handover information obtained from the NRT.

9. The method of claim 8, wherein
the NRT comprises a record associated with a tuple comprising information indicating the altitude of the first access point and information indicating altitude of the second access point, and
the step of using information indicating the altitude of the WD, the altitude of the first access point, and altitude of the second access point to obtain information from the NRT comprises:
using information indicating the altitude of the first access point and information indicating altitude of the second access point to locate the record, and
using information indicating the altitude of the WD to locate the handover information within the record.

10. A method performed by a wireless device (WD) of a wireless communications network, the wireless communications network comprising a first base station and a second base station, the first base station comprising an access point providing radio coverage to a first cell within which the WD is located and wherein the WD is connected to the first base station, the second base station comprising an access point providing radio coverage to a second cell, the method comprising:
detecting, by the WD, signals from the second cell;
obtaining, by the WD, an indication of an altitude of the access point of the second base station;
obtaining, by the WD, an indication of an altitude of the WD; and
sending, from the WD to the first base station, the altitude indication of the access point of the second base station and the altitude indication of the WD.

11. The method of claim 10, further comprising:
obtaining information regarding whether the second cell is present in a Neighbor Relation Table (NRT) of the first base station.

12. The method of claim 10, further comprising:
receiving instructions on how to act, in response to the sending of altitude information.

13. The method of claim 12, wherein receiving instructions on how to act comprises receiving instructions to perform measurements on base stations other than the first and second base stations.

14. The method of claim 12, wherein receiving instructions on how to act comprises receiving instructions regarding a movement of the connection of the WD from the first base station to the second base station, based on the altitude indication of the access point of the second base station, the altitude indication of the WD and an indication of an altitude of the access point of the first base station obtained from the first base station.

15. The method of claim 10, further comprising:
obtaining an indication of an altitude of the access point of the first base station;
sending the altitude indication of the access point of the second base station, the altitude indication of the WD, and the altitude indication of the access point of the first base station to a network node of the wireless communication network other than the first base station.

16. A first base station operable in a wireless communications network, the first base station comprising a first access point operable to provide radio coverage to a first cell, the wireless communications network further comprising a second base station having a second access point providing radio coverage to a second cell, wherein a wireless device (WD) is located within the first cell and is operable to be connected to the first base station, the first base station comprising:
processing circuitry; and
a memory, said memory containing instructions executable by said processing circuitry, whereby said first base station is operative for:
receiving a message from the WD indicating the second cell;
obtaining an indication of an altitude of the access point of the second base station; and
obtaining an indication of an altitude of the WD;
obtaining an indication of an altitude of the access point of the first base station
determine whether the WD should refrain from performing measurements of the second cell, wherein the determination is based on the altitude of the WD, the altitude of the first access point, and altitude of the second access point; and
as a result of determining that the WD should refrain from performing measurements of the second cell, transmit to the WD a message for configuring the WD to refrain from performing measurements of the second cell.

17. The first base station of claim 16, further operative for:
obtaining information regarding whether the first cell is present in a Neighbor Relation Table (NRT) of the first base station.

18. The first base station of claim 16, further operative for:
making a handover decision for the WD based on the altitude indication of the second access point of the second base station, the altitude indication of the WD, and the altitude indication of the first access point of the first base station.

19. A wireless device (WD) operable in a wireless communications network, the wireless communications network comprising a first base station and a second base station, the first base station comprising an access point providing radio coverage to a first cell within which the WD is located and wherein the WD is operable to be connected to the first base station, the second base station comprising an access point providing radio coverage to a second cell, the WD comprising:
- processing circuitry; and
- a memory, said memory containing instructions executable by said processing circuitry, whereby said WD is operative for:
- detecting signals from the second cell;
- obtaining an indication of an altitude of the access point of the second base station;
- obtaining an indication of an altitude of the WD;
- sending the altitude indication of the access point of the second base station and the altitude indication of the WD to the first base station.

20. The WD of claim 19, further operative for:
- obtaining information regarding whether the second cell is present in a Neighbor Relation Table (NRT) of the first base station.

21. A computer program product comprising a non-transitory computer readable medium storing a computer program for configuring a base station to perform the method of claim 1.

22. A computer program product comprising a non-transitory computer readable medium storing a computer program for configuring a wireless device to perform the method of claim 10.

* * * * *